3,065,084
PRESERVATION OF POULTRY
Daniel Melnick, Teaneck, N.J., George A. Perry, Elmhurst, N.Y., and Robert L. Lawrence, Middlesex, N.J., assignors to Corn Products Company, New York, N.Y., a corporation of Delaware
No Drawing. Filed Dec. 7, 1959, Ser. No. 857,578.
9 Claims. (Cl. 99—194)

This invention relates to the processing of poultry such as chickens, geese, turkeys and the like. More particularly, this invention relates to an improvement in the processing of poultry which extends the shelf life of freshly dressed refrigerated poultry.

The spoilage of poultry due to its relatively short shelf life is a serious problem in the food industry and is one upon which considerable time and money have been spent. At the present time, considerable research is being done on this problem and one of the main routes by which an attempt is being made to solve this problem and to extend the shelf life of poultry is by the incorporation of antibiotics in certain of the conventional processing steps. Generally, however, this approach has proven unsatisfactory and has resulted in extending the shelf life of dressed poultry for only a short period of time, for example, for 1 or 2 days more. The appearance in increasing number of antibiotic-resistant bacteria and yeasts in only those plants where antibiotics are in use nullifies their effectiveness. Moreover, the use of antibiotics in foods has encountered considerable resistance both from governmental authorities and from the public generally, and this is particularly true when the antibiotic is present in the food product at the time of consumption of the product. Among the primary reasons for this resistance to antibiotics are the side reactions which many times occur in persons allergic to the particular antibiotic and also the fear of developing antibiotic-resistant bacterial strains in the human body over a period of time, if the antibiotic is regularly consumed with the food.

In the conventional processing of poultry it is customary to sacrifice the birds and then to scald them with water at temperatures of about 128° F. to 140° F. to facilitate removal of feathers by mechanical plucking machines. Plucking is followed by cleaning and it is customary to eviscerate the birds, chill or cool the carcasses by soaking them in an ice-slush bath or water-chilling bath for about 20 minutes to 24 hours. This soaking operation results in hydration of the carcasses, up to 7% increase in weight, and is almost universally done to poultry. Poultry is unique in that this is the only food product treated in this manner. After evisceration and hydration, the birds may be cut up or otherwise processed depending upon whether roasters, fryers or parts are desired, or may be packed whole in ice for shipment to market. During processing, an increase in the number of microorganisms occurs due to the handling of the birds. Storage of the poultry generally results in flavor changes in two days and spoilage in about 5–7 days at 35° F.–45° F.

It is, therefore, an object of this invention to provide a process for increasing the shelf life of refrigerated poultry.

It is another object of this invention to provide dressed poultry products in which the spoilage microorganisms are inhibited during storage at refrigeration temperatures.

These and other objects of the invention will be apparent from the following detailed description.

According to the present invention, there is provided a process for increasing the shelf life of poultry which comprises depositing upon the skin and exposed parts of a hydrated acidified bird an edible preserving agent consisting of a sorbic acid component. Henceforth in this application, when we refer to a sorbic acid component, it is intended to include either sorbic acid or edible sorbic acid salts, such as the potassium, sodium or calcium salts.

We have found that when the sorbic acid component is deposited upon the skin and exposed parts of a hydrated acidified bird in an amount of about 0.03 to 3 milligrams per square centimeter of the bird, and preferably in an amount of about 0.1 to 1 milligram per square centimeter, the shelf life of the bird is greatly increased. We have found that the minimum increase in shelf life is usually as much as 100% or more, when comparison is made with carcasses preserved without the added sorbic acid component.

The application of the sorbic acid component fits easily into the conventional processing of dressed and eviscerated poultry. The heart, liver and gizzard of the dressed poultry are treated in the same manner as the bird. Furthermore, this process may be applied to birds which are freshly slaughtered, poultry which is to be frozen, or to conventional refrigerated poultry, shipped in direct contact with chopped ice, shortly after it reaches the point of retail sales. Antioxidants and/or metal chelating agents may be included in the solutions applied to the poultry, in accordance with our processes, to prevent rancidity developing as a result of the extended shelf life of the poultry.

In accordance with our process, the sorbic acid salts may be applied during the water-chilling step or in a subsequent application. The free sorbic acid is applied only after the water-chilling step. Alternatively, the salt may be applied to the hydrated bird after the chilling step by means of a dip, spray, or paint in an edible vehicular material or combination of edible vehicular materials. The sorbic acid is applied after the water-chilling step because of its low solubility in cold water and is generally applied as a dip, spray, or paint in an edible vehicular material or combination of edible vehicular materials, or as a dust.

We have found it particularly desirable to dissolve or suspend the sorbic acid component, which includes both the sorbic acid and/or sorbic acid salts, in a vehicular material such as water, glycerine, propylene glycol or ethanol, the choice of the vehicular material depending upon the particular component employed and upon the particular conditions and mode of application to be used. Whereas the sodium and potassium salts of sorbic acid are highly soluble in water, i.e. in excess of 25% by weight of the solution, sorbic acid as such is only soluble to a limited degree in water, 0.15% by weight at 68° F. In hot water, viz., at about 200° F., the solubility of free sorbic acid is markedly increased to about 2.5% by weight. It is preferable in our process to have a large part of the sorbic acid in solution and hence we prefer using vehicular materials such as propylene glycol, isopropanol, or 95% ethanol for this purpose; at 68° F. sorbic acid is soluble in these vehicular materials in concentrations up to 5.5, 8.4, and 12.6%, respectively. In liquid and hydrogenated vegetable oils, such as cottonseed or corn oil the solubility of sorbic acid is increased from about 0.5 to about 8% by increasing the temperature from 68° F. to 200° F. Combinations of solvents are also effective in our process, and preference is for those combinations which still exhibit a relatively high solubility for sorbic acid, about 2.5% by weight or more of sorbic acid in solution. The sorbic acid is present in the vehicular material in amount of about 1 to 20% by weight, preferably in amount of about 2.5 to 7%.

Examples of combinations of vehicular materials for the application of sorbic acid to poultry are propylene glycol:ethanol solution (70:30); propylene glycol:water:glycerine solution (70:20:10); propylene glycol:cottonseed oil:water dispersion (80:20); and cottonseed oil:water emulsion (50:50); all parts being by weight. Surprisingly, the use of the vehicular materials for sorbic acid contributed to reduced drainage loss of moisture from the hydrated acidified birds, a desirable side-effect of the novel processes of the present invention. In using these particular formulations it is preferable to maintain them at a temperature of about 120–180° F. in order to keep a large part of the sorbic acid in solution. Lower temperatures of about 68 to 100° F. may be used when the vehicular material has a high solubility for sorbic acid and the latter is present in concentrations not in excess of maximal solubility; viz., 7% in the case of the above mentioned propylene glycol:ethanol solution and 5% when propylene glycol is the sole solvent. The cottonseed oil:water vehicular material as an oil-in-water emulsion provides an unabsorbed thin transparent fat coating with the sorbic acid in it uniformly distributed over the entire surface of the bird.

In the process of the present invention, we have found that the desired extension of the shelf life of poultry is attained only after there is deposited upon the skin and exposed parts of a hydrated bird an edible acidifying agent as well as an edible sorbic acid component. We have found, surprisingly enough, that when the poultry is treated in this manner the shelf life is extended to a greater extent than when either the acidifying agent or fungistatic agent is used alone. For example, the shelf life of birds treated in this manner may be extended to about 18 days, even when the poultry is held at a temperature of 45° F. rather than at the more conventional temperature of about 35° F.

The acidifying agents which have been found suitable are edible acids or edible acid salts such as phosphoric acid, citric acid, lactic acid, sodium dihydrogen phosphate, sodium bisulfate, and the like. The amount of the acidifying agent used should be such as to lower the pH on the skin and exposed parts of the bird to an initial value of about 5.5 or lower. This initial pH of 5.5 or less must also be attained after salts of sorbic acid are applied to the bird, i.e., a sufficient excess of acidifying agent must be used to convert a major part of the applied sorbate to free sorbic acid.

In carrying out the process of this invention many variations of the process are possible just so long as an acidifying agent and a sorbic acid component are applied to the hydrated bird. For example, the bird may be acidified during the hydration step by including the acidifying agent in the chilling water, and this followed by deposition of the sorbic acid on the carcass by means of a spray, dip, paint or dust; following hydration in the ice water, a single mixture of the acidifying agent and sorbic acid can be applied to the hydrated bird; or the sorbic acid component may be applied first and the acidifying agent applied afterwards. Obviously, many modifications of this process will be apparent to those skilled in the art and we have found that the shelf life of the poultry may be extended to a considerable extent using any of these modifications just so long as there is deposited upon the hydrated bird an acidifying agent and a sorbic acid component.

A preferred procedure for carrying out the invention involves hydrating the plucked, eviscerated and cleaned birds in a water-chilling bath for about 2 to 3 hours so that the bird is chilled to about 33–34° F. The chilled water is maintained in an acidic condition by the addition thereto of the acidifying agent in such concentration as to lower the pH on exposed parts of the bird to an initial value of 5.5 or lower. Generally, 0.1 to 5% of the acidifying agent, based on the weight of the chilling water, is sufficient to produce the desired acidic conditions. After removing the bird from the acidified chilling water, the sorbic acid component in an edible vehicular material or combination of edible vehicular materials is applied to the bird as a dip, spray or paint. When the sorbic acid component is applied to the surface of the bird in a powdered carrier, the filler is a water-soluble component such as dextrose. When sorbic acid alone is applied, it is sublimed and allowed to condense on the chilled surfaces of the hydrated acidified poultry. The sorbic acid component is preferably dissolved in a solvent, as disclosed above, and applied as a spray. During storage of the poultry the acidifying agent and the sorbic acid are progressively neutralized by the protein of the carcass so that the surface pH increases above 5.5 and approaches neutrality. Despite this change in pH the marked extension in shelf life of the poultry is obtained. The flavor of the cooked poultry is not distinguishable from the fresh, non-acidified, sorbic acid-free poultry similarly cooked.

The concentration of the sorbic acid component deposited on the bird must be controlled within the limits mentioned above, i.e., between 0.03 to 3 milligrams per square centimeter or else the appearance of the bird will be adversely affected.

At concentrations less than 0.03 milligrams per square centimeter, the surface of the poultry carcass develops within 5 to 7 days at 35° F.–45° F. a slimy covering due to failure to inhibit microbiological growth. At concentrations in excess of 3 milligrams per square centimeter, the surface of the bird exhibits a permanent whitish appearance which is objectionable to the consumer. These birds, though free from microbiological spoilage, are organoleptically unacceptable as a result of the sorbic acid coming out of solution on the surface of the bird in such high concentrations that reabsorption into the carcass does not occur within the holding period prior to sale.

The concentration of sorbic acid in the vehicular material should be in excess of 1% and preferably in excess of 2.5%. If a solution of less than 1% is employed, too much of the solution will be required to provide the required 0.03 to 3 milligrams of sorbic acid per square centimeter of carcass surface. The protective covering will then be in such a large amount as to impart to the surface of the carcass a slick appearance and feel; this is objectionable to butchers and housewives as it is associated in their minds with the presence of slime-forming bacteria which cause spoilage. It is for this same reason that highly viscous vehicular materials, such as gum, agar or pectinate solutions, may not be used to apply the sorbic acid component even in desired concentration to the carcass surfaces.

For a more detailed description of the invention reference is now made to the following examples. Obviously many modifications are available to those skilled in the art and we intend to be bound only by the spirit and scope of the appended claims. In order to demonstrate the discovery which forms the basis of the present invention, we also include results obtained in studies conducted on a number of control systems.

CONTROL I

A freshly killed, defeathered, eviscerated chicken was cut up and the parts held in an ice water bath containing chopped ice in order to maintain a temperature of 33° F. After 2 hours the parts were removed, drained, wrapped in cellophane (450 LSAD) and held at 45° F. After 5 days the poultry parts were putrid in odor and slimy to the touch.

CONTROL II

A fresh cut-up chicken was treated as in Control I except that the parts were held in acidified ice water containing chopped ice. The ice water and ice were made up of a 2% solution of $NaH_2PO_4$. After 2 hours the parts were removed and drained. The surface of the bird had a pH of 4.5. The parts were wrapped in the cellophane and held at 45° F. After 6 days the poultry parts were putrid in odor and slimy to the touch.

CONTROL III

A freshly cut-up chicken was treated exactly as in Control I except that following hydration the parts were sprayed with a 7.5% sorbic acid solution in a vehicular material consisting of propylene glycol:water:glycerine (70 parts:20 parts:10 parts). The temperature of the spray solution was 140° F. The amount of sorbic acid deposited on the surfaces of the poultry thus treated was about 0.3 mg. per cm.² The parts were wrapped in the cellophane as in Control I and held at 45° F. After 9 days the parts were unacceptable in odor and in feel.

Example 1

A freshly cut-up chicken was treated as in Control II except that following acid hydration the parts (surface pH of 4.5) were subjected to the same spray solution used in Control III (7.5% sorbic acid in a vehicle having the composition of 70 parts propylene glycol, 20 parts water, 10 parts glycerine). The temperature of the spray solution was the same (140° F.) and the amount of sorbic acid deposited on the carcass was also the same (about 0.3 mg. per cm.²). The parts were wrapped in the cellophane and held at 45° F. These poultry parts kept for 18 days at 45° F. before the first evidence of spoilage was noted.

Example 2

A freshly cut-up chicken was treated exactly as in Control II except that a 5% concentration of $NaH_2PO_4$ was used to prepare the chilling water bath and the chicken parts with a surface pH of 4.5 were dipped in a 2% sorbic acid solution in propylene glycol. The dipping solution was at 75° F. and the parts were drained of excess solvent before wrapping in the cellophane. The amount of sorbic acid deposited on the exposed parts was 0.2 mg. per cm.² The thus treated parts had a shelf life of 17 days at 45° F.

Example 3

A freshly cut-up chicken was treated by immersing the parts for 30 minutes in acidified cold water maintained at 35° F. The ice water contained 0.5% of sodium bisulfate. The surface of the bird had a pH of 2. The carcass parts were sprayed with a 20% solution of potassium sorbate in water to deposit on the surfaces of the bird about 0.2 mg. of the sorbic acid component per cm.² The parts were wrapped in the cellophane and held at 45° F. After 12 days the poultry exhibited the first evidence of spoilage.

Example 4

A freshly cut-up chicken was treated by immersing the parts for 18 hours in an ice water bath containing chopped ice. The chicken parts were consecutively sprayed, first with a 25% solution of citric acid in water to provide a surface pH of 4 and then with a 12% solution of sorbic acid in propylene glycol (the latter solution at 160° F.) to provide about 0.1 mg. of sorbic acid per cm.² of surface area. The parts were wrapped in cellophane and held at 45° F. The poultry parts kept for 12 days at 45° F. before spoilage was apparent.

Example 5

A freshly cut-up chicken was treated by immersing the parts for 3 hours in acidified cold water maintained at 35° F. The ice water contained 1% of phosphoric acid. The surface of the bird had a pH of 2.5. The chicken parts were then rapidly dipped in an agitated dispersion of cottonseed oil in propylene glycol (20:80) at 180° F. and containing 18% sorbic acid in solution and in suspension. The drained chicken parts contained about 2.5 mg. of sorbic acid per cm.² of surface area. The surface of the chilled bird was covered with a white deposit of sorbic acid crystals suspended in the coating of vehicular material. It required 28 days for the chicken parts, wrapped in cellophane and held at 45° F., to evidence the first signs of spoilage. However, fully seven days of storage were required before the sorbic acid crystals on the surface were absorbed into the hydrated bird. Thus, one-fourth of the shelf life of the poultry was dissipated during the period required for eliminating the objectionable surface appearance of the treated bird. The process in Example 5 is intended for use when it is known that the poultry will not be marketed during the first week after processing and when a long shelf life is required, viz., in shipment to some distant marketing area.

Example 6

A freshly cut-up chicken was treated by immersing the parts for 3 hours in cold water maintained at 35° F. The chicken parts were then sprayed with a cottonseed oil-in-water (50:50) emulsion at 175° F. and containing a total of 5% sorbic acid, mostly in solution. The aqueous phase contained in solution 10% citric acid and 1% glyceryl mono-oleate, the latter serving as an emulsifying agent for keeping the cottonseed oil finely dispersed. The surface pH of the chicken parts was 4 and there was deposited on the surfaces about 0.3 mg. of sorbic acid per cm.² The parts were wrapped in cellophane and held at 45° F. The poultry kept for 17 days at 45° F. before spoilage was apparent.

Example 7

The poultry was prepared as in Control II. After removal from the chilled acidified water, the chicken parts were drained and immediately thereafter passed through a closed chamber, all the walls of which were at 250° F. Sorbic acid, fed by funnel feed into this chamber, was in the form of a fine cloud in this enclosure due to heat sublimation of the sorbic acid. This sublimed sorbic acid deposited as fine crystals on the chilled surfaces of the hydrated acidified bird during its 3 second passage through the chamber; the deposition amounted to 0.4 mg. of sorbic acid per cm.² After 24 hours at 45° F., the treated chicken parts in the cellophane wrapper exhibited on the surface no detectable crystals of sorbic acid due to the migration of the sorbic acid into the chicken. The treated poultry was free from evidence of spoilage for a period of 12 days.

The synergistic value of the combination of acid hydration and sorbic acid in preserving refrigerated poultry is apparent from the data in Table I below, said table also including findings on the microbiological population on the poultry surfaces in a number of test systems.

TABLE I.—SYNERGISTIC VALUE OF THE COMBINATION OF ACID HYDRATION AND SORBIC ACID IN PRESERVING REFRIGERATED POULTRY

| Test System | Hydrated Chicken Parts | | Shelf Life at 45° F. | | Microbiological Counts on Poultry after 5 days at 45° F. | | | |
|---|---|---|---|---|---|---|---|---|
| | Acid Treatment | Sorbic Acid on Surface, mg./cm.$^2$ | Observed, Days | Gain, Days | Total Bacteria,[1] Microorganisms/gm. of Skin | Yeast and Molds,[2] Microorganisms/gm. of Skin | Microaerophils,[3] Microorganisms/gm. of Skin | Coliform,[4] Microorganisms/gm. of Skin |
| | | | | | Million | | | |
| Control I | None | 0.0 | 5 | 0 | 150 | 1 million | 100 million | 1 million. |
| Control II | NaH$_2$PO$_4$ | 0.0 | 6 | 1 | 54 | 5 million | 7 million | 1 million. |
| Control III | None | 0.3 | 9 | 4 | 6 | 6 million | 4 million | 10 thousand. |
| Example 1 | NaH$_2$PO$_4$ | 0.3 | 18 | 13 | 1 | 6 thousand | 100 thousand | 1 thousand. |
| Example 2 | NaH$_2$PO$_4$ | 0.2 | 17 | 12 | 2 | 14 thousand | 100 thousand | 1 thousand. |

[1] Determined on plate count agar (Difco Lab.) incubated at 45° F. for 10 days.
[2] Determined on potato-dextrose agar (Difco Lab.) acidified to pH 3.5 with tartaric acid and incubated at 45° F. for 10 days.
[3] Determined with thioglycollate medium (Baltimore Biological Lab.) incubated at 45° F. for 10 days.
[4] Determined with formate ricinoleate broth (Difco Lab.) incubated at 45° F. for 10 days.

The terms and expressions which we have employed are used as terms of description and not of limitation, and we have no intention, in the use of such terms and expressions, of excluding any equivalents of the features described or portions thereof, but recognize that various modifications are possible within the scope of the invention claimed.

We claim:
1. A process for improving the shelf life of freshly killed poultry which comprises hydrating the freshly killed poultry for about 20 minutes to 24 hours in an acidic water-chilling bath containing about 0.1 to 5% by weight of the water-chilling bath of an acidifying agent to provide an initial surface pH on said poultry of not more than about 5.5 and then depositing upon the skin and exposed parts of said poultry a sorbic acid component selected from the group consisting of sorbic acid and edible sorbic acid salts in an amount of about 0.03 to 3 milligrams per square centimeter of the carcass surface.

2. The process of claim 1 wherein said acidifying agent is selected from the group consisting of phosphoric acid, lactic acid, citric acid, sodium dihydrogen phosphate and sodium bisulfate.

3. The process of claim 1 wherein said sorbic acid component is deposited upon said poultry in an amount of about 0.1 to 1 milligram per square centimeter of the carcass surface.

4. A process for improving the shelf life of freshly killed poultry which comprises hydrating said freshly killed poultry for 20 minutes to 24 hours in an acidic water-chilling bath containing about 0.1 to 5% by weight of the water-chilling bath of an acidifying agent selected from the group consisting of phosphoric acid, lactic acid, citric acid, sodium dihydrogen phosphate and sodium bisulfate to provide an initial surface pH on said poultry of not more than about 5.5 and then depositing on the skin and exposed parts of said hydrated bird a sorbic acid component selected from the group consisting of sorbic acid and edible sorbic acid salts in a vehicular material such that the sorbic acid component is deposited in an amount of about 0.1 to 3 milligrams per square centimeter of carcass surface.

5. The process of claim 4 wherein there is present in said vehicular material 1 to 20% of sorbic acid component by weight.

6. The process of claim 4 wherein the sorbic acid component is applied to the hydrated bird by dipping said bird in the vehicular material containing the sorbic acid component.

7. The process of claim 4 wherein about 2.5 to about 7% by weight of sorbic acid is substantially dissolved in said vehicular material.

8. The process of claim 4 wherein a solution of about 2.5 to about 7% by weight of sorbic acid is used and the said vehicular material comprises propylene glycol.

9. The process of claim 4 comprising dissolving about 2.5 to about 7% by weight of sorbic acid in said vehicular material which comprises propylene glycol and depositing said sorbic acid solution on said poultry by spraying.

References Cited in the file of this patent

UNITED STATES PATENTS 2,930,702     Winterbottom et al. _____ Mar. 29, 1960
2,933,399     Nickerson et al. _____ Apr. 19, 1960